United States Patent Office 3,300,529
Patented Jan. 24, 1967

3,300,529
ALKYLENESULFONAMIDES AND METHOD OF PREPARING SAME
Gerald Berkelhammer, Trenton, N.J., and Richard W. Young, Wellesley Hills, Mass., assignors to American Cyanamid Company, Stamford, Conn., a corporation of Maine
No Drawing. Filed Jan. 13, 1964, Ser. No. 337,127
15 Claims. (Cl. 260—556)

This is a continuation-in-part application of our copending United States application Serial No. 25,529, filed on April 29, 1960, now abandoned.

The present invention relates to N-alkyl-substituted ethylenesulfonamides and derivatives thereof. More particularly, the instant discovery concerns a novel process for preparing N-alkyl-substituted ethylenesulfonamides wherein a β-haloethanesulfonyl halide is reacted with an aliphatic primary or secondary amine at a relatively low temperature to produce the corresponding N-alkyl-substituted ethylenesulfonamide.

Heretofore, the compounds which are the object of the present invention have been prepared by a two-step and necessarily cumbersome process as taught by C. S. Rondestvedt, Jr., J. Am. Chem. Soc. 76, 1926 (1954). This process involves the following:

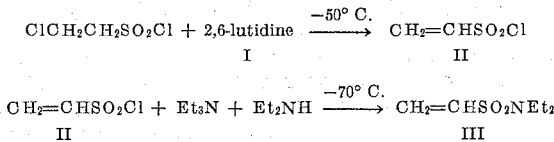

One of the main disadvantages of the Rondestvedt process is that intermediate compound II is highly lachrymatory and and is violently unstable at room temperature in the presence of certain tertiary bases, e.g., pyridine, which conceivably might be used in the preparation of the intermediate. Compound II, furthermore, must be carefully distilled to avoid decomposition.

Perhaps because compound II is recovered only by a sensitive distillation process, because it is unstable at room temperature, and because of other like difficulties, Rondestvedt reports yields of only 34 percent by weight, based on the β-chloroethanesulfonyl chloride reactant.

According to the present discovery it has been found that the N-alkyl-substituted ethylenesulfonamides, i.e., N,N-dialkyl ethylenesulfonamides and N-alkyl ethylenesulfonamides, may readily be produced in superior yields and in a one-step process not hindered by the necessity for isolating lachrymatory and unstable intermediates. Pursuant to the instant invention a β-haloethanesulfonyl halide is brought into reactive contact with at least about an equivalent of an aliphatic primary or secondary amine at a temperature in the range of 40° C. to −80° C. and in the presence of a hydrohalide acceptor, such as triethylamine, and the corresponding N-alkyl-substituted ethylenesulfonamide recovered.

If desired, the reaction may be made to take place in the presence of an inert organic solvent, such as chloroform, toluene, or the like.

According to a particular embodiment of the present invention an excess of the reactant aliphatic primary or secondary amine may be used as the hydrohalide acceptor. This will be better understood hereinafter.

Typical primary and secondary amines contemplated herein are diethylamine, ethylamine, dipropylamine, propylamine, dioctylamine, octylamine, decylamine, didodecylamine, isopropylamine, diisopropylamine, laurylamine, dilaurylamine, methyllaurylamine, 2-ethylhexylamine, stearylamine, distearylamine, octadecylamine, dioctadecylamine, allylamine, diallylamine, morpholine, piperidine, pyrrolidine, benzylamine, and the like. While these are only typical it is understood that monoaliphatic amines having from 1 to about 20 carbon atoms and di-aliphatic amines having 2 to about 20 carbon atoms are contemplated herein, as well as other cyclic diamines.

As indicated hereinabove, temperatures in the range of 40° C. to −80° C. are suitable; however, preferred temperatures are in the range of 0° C. to about −70° C.

Other inert organic solvents within the purview of the instant discovery are trichloroethylene, perchloroethylene, dichloroethane, benzene, xylene, dioxane, tetrahydrofuran, and similar halogenated aliphatic hydrocarbons, aromatic hydrocarbons, and ether solvents which under the conditions of the reaction do not react with the reactants and their products.

The reactions contemplated herein admit of super-atmospheric and sub-atmospheric pressures, as well as atmospheric pressures. In addition, the reactants may be brought together in any desired sequence and reaction may be made to take place in a batch, continuous or semi-continuous manner.

It has been found, pursuant to the instant discovery, that the N-alkyl-substituted ethylenesulfonamides prepared as shown above may be reacted with at least about a molar equivalent of a hydrohalide to prepare the corresponding 2-halo-N-alkyl-substituted ethanesulfonamide. The following reaction is typical:

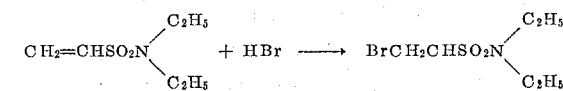

The reaction conditions parallel those given hereinabove relative to the preparation of the N-alkyl-substituted ethylenesulfonamide, with the exception that temperatures as high as 60° C. or somewhat higher may be employed. Room temperature (20° C.–25° C.) is preferred, however.

These 2-halo-N-alkyl-subsituted ethanesulfonamide derivatives may, in turn, be reacted as disclosed in Belgian Patent 568,089, of May 28, 1958, and French Patent 1,196,415, of November 24, 1959, to prepare useful sulfamoylethyl phosphorodithioate insecticides.

Other typical hydrohalide acceptors contemplated herein for preparing N-alkyl-substituted ethylenesulfonamides are pyridine, 2,6-lutidine, collidine, trimethylamine, tripropylamine, and the like. The hydrohalide acceptor is generally present in the ratio of at least about 2 moles of acceptor per mole of 2-haloethanesulfonyl halide. If desired more than 2 moles, say, up to about 5 moles or more may be employed. This is true also, of course, if excess primary or secondary amine is used as the hydrohalide acceptor; in such a case, generally at least about 3 moles of the amine per mole of haloethanesulfonyl halide is employed.

The following examples best illustrate the present invention:

EXAMPLE I

*N-isopropyl ethylenesulfonamide*

A mixture of 29.5 grams (0.5 mole) of isopropylamine and 101 grams (1.0 mole) of triethylamine is added with stirring over a 15-minute period to a solution of 81.5 grams (0.5 mole) of 2-chloroethanesulfonyl chloride in 1 liter of ether kept at −70° C. with a Dry Ice-actone bath. Stirring is continued for 15 minutes at −70° C. following the addition, then for an hour while allowing the reaction mixture to warm gradually to 10° C. The triethylamine hydrochloride is filtered off and the filtrate concentrated to 100 milliliters and washed with 15 milliliters of water. Drying over anhydrous sodium sulfate and stripping leaves 39.2 grams (52.5 percent by weight) of an orange liquid which is distilled under vacuum in an atmosphere of nitrogen to give 28.7 grams of a light yellow oil, boiling point 94° C.–97° C./0.6 millimeter mercury pressure. Redistillation gives the analytical sample, boiling point 95° C.–96.5° C./0.55 millimeter mercury pressure, $n_D^{25}$ 1.4612, as an almost colorless liquid.

EXAMPLE II

N,N-diethyl ethylenesulfonamide

A solution of 22.4 grams (0.3 mole) of diethylamine and 31 grams (0.3 mole) of triethylamine in 100 milliliters of ether is added over a 40 minute period, with stirring, to 25 grams (0.15 mole) of 2-chloroethanesulfony chloride in 250 milliliters of ether. The temperature is maintained at 0° C. to −5° C. by means of an ice-methanol bath. Stirring is continued for another hour at this temperature after which the precipitated triethylamine hydrochloride is filtered off and the filtrate concentrated under vacuum to give 24 grams of a brown liquid. Distillation under reduced pressure yields 12.4 grams of product, boiling point 90° C.–96° C./2.5 millimeters mercury pressure, $n_D^{25}$ 1.4602.

EXAMPLE III

N,N-diethyl ethylenesulfonamide

The procedure is the same as that of Example II with the exception that 11.2 grams (0.15 mole) of diethylamine is used and following the removal of the triethylamine hydrochloride, the filtrate is washed with 5 percent hydrochloric acid and dried over magnesium sulfate. There is obtained 9.0 grams of product, boiling point 80° C.–82° C./0.65 millimeter mercury pressure.

EXAMPLE IV

N,N-diethyl ethylenesulfonamide

The procedure of Example III is followed with the exception that the reaction temperature is maintained at −65° C. to −70° C. by means of a Dry Ice-acetone bath. The yield of product, boiling point 80° C.–82° C./0.65 millimeter mercury pressure, is 9.95 grams.

EXAMPLES V–XVII

Example II, above, is repeated in every essential respect except that the changes and substitutions appearing in the following table are made:

EXAMPLE XVIII

2-bromo-N,N-diethyl ethanesulfonamide

Hydrogen bromide gas is passed at a moderate rate through an ice-cooled solution of 10 grams (0.065 mole) freshly distilled N,N-diethyl ethylenesulfonamide (C. S. Rondestvedt, Jr., J. Am. Chem. Soc., 76, 1928 (1954)) in 100 milliliters of anhydrous ether for a half hour. The reaction flask is stoppered and allowed to stand at room temperature for 7 hours. Evaporation of the ether, followed by recrystallization of the residual solid from benzene, with the aid of activated charcoal, gives 12.5 grams (84 percent by weight) of fine white needles, melting point 56.5° C.–58° C. Two additional recrystallizations from ether yield analytically pure material melting at 58° C.–58.5° C.

EXAMPLE XIX

2-bromo-N-isopropyl ethanesulfonamide

Hydrogen bromide gas is passed through a solution of N-isopropyl ethylenesulfonamide (14.9 grams, 0.1 mole) in 200 milliliters of reagent-grade ether, with stirring for 1.5 hours. The rate of addition is adjusted to keep the temperature between 30° C. and 34° C. The solution gradually becomes orange. After an additional one-hour's standing at room temperature in a closed flask, the ether solution is washed with 20 milliliters of water. The water layer is extracted with three 50-milliliter portions of ether, followed by 3 50-milliliter portions of chloroform. It is necessary to add water in order to obtain separation of the phases during the chloroform extraction. The combined ether solution and extracts and the chloroform extracts are dried over anhydrous sodium sulfate and the solvents removed under vacuum. There are obtained 19.2 grams (84 percent by weight) of tan crystals, melting point 93° C.–94° C. Recrystallization from ether gives light pink crystals which are freed of adsorbed hydrogen bromide by slurrying in 20 percent potassium bicarbonate solution, filtering, washing several times with water, and drying in a vacuum desiccator over calcium chloride; yield 14.2 grams (62 percent by weight) of light pink crystals, melting point 94.5° C.–96° C.

By following the procedure and conditions given in Examples XVIII or XIX, the 2-halo-N-alkyl-substituted ethanesulfonamides corresponding to the products of Examples III to XVII, above, are similarly produced.

TABLE I

| Example | Reactants | | Solvent | Hydrohalide Acceptor | Temperature, ° C. | Product |
|---|---|---|---|---|---|---|
| | 2-haloethanesulfonyl halide | Amine | | | | |
| V | 2-bromoethanesulfonyl chloride. | Ethylamine | Chloroform | Pyridine | −40 | N-ethyl ethylenesulfonamide. |
| VI | 2-chloroethanesulfonyl chloride. | Dioctylamine | Toluene | 2,6-lutidine | −60 | N,N-octyl ethylenesulfonamide. |
| VII | -----do----- | Decylamine | Perchloroethylene | Collidine | −4 | N-decyl ethylenesulfonamide. |
| VIII | -----do----- | Laurylamine | Ether | 2,6-lutidine | −70 | N-dodecyl ethylenesulfonamide. |
| X | 2-bromoethanesulfonyl chloride. | Dilaurylamine | Dichloroethane | Triethylamine | −70 | N,N-didodecyl ethylenesulfonamide. |
| X | 2-chloroethanesulfonyl chloride. | Methyllaurylamine | Dioxane | Pyridine | −70 | N-methyl-N-dodecyl ethylenesulfonamide. |
| XI | -----do----- | Octadecylamine | Tetrahydrofuran | Excess octadecylamine.* | 10 | N-octadecyl ethylenesulfonamide. |
| XII | -----do----- | 2-ethylhexylamine | Benzene | Excess 2-ethylhexylamine.* | 0 | N-2-ethylhexyl ethylenesulfonamide. |
| XIII | -----do----- | Piperidine | Ether | Triethylamine | −70 | N-ethylenesulfonyl piperidine. |
| XIV | -----do----- | Morpholine | Benzene | Excess morpholine.* | 35 | N-ethylenesulfonyl morpholine. |
| XV | -----do----- | Allylamine | Ether | Triethylamine | −70 | N-allyl ethylenesulfonamide. |
| XVI | -----do----- | Diallylamine | -----do----- | -----do----- | 15 | N,N-diallyl ethylenesulfonamide. |
| XVII | -----do----- | Benzylamine | -----do----- | -----do----- | −70 | N-benzyl ethylenesulfonamide. |

*By excess is meant two molar equivalents (in addition to the amine reactant) per mole of 2-haloethanesulfonyl halide reactant.

The following examples illustrate the conversion pursuant to the present invention of N-alkyl-substituted ethylene sulfonamides, prepared as in Examples I–XVII, above, to their corresponding 2-halo-N-alkyl-substituted thanesulfonamides.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A method which comprises reacting a β-halo-ethanesulfonyl halide with one molar equivalent of a member selected from the group consisting of alkyl amine having from 1 to 20 carbon atoms, di-alkyl amine in which each alkyl has from 2 to 20 carbon atoms, alkenyl amine having from 3 to 20 carbon atoms, di-alkenyl amine in which each alkenyl has from 3 to 20 carbon atoms, and benzylamine at a temperature in the range of 40° C. to −80° C. and in the presence of an amine hydrohalide acceptor, and recovering the resulting corresponding ethylenesulfonamide.

2. The process of claim 1 wherein the reaction is made to take place in the presence of an inert organic solvent.

3. The process of claim 1 wherein the temperature is in the range of 0° C. to −70° C.

4. The process of claim 1 wherein the hydrohalide acceptor is the amine reactant present in excess of at least two molar equivalents.

5. The process of claim 1 wherein the halide reactant is β-chloroethanesulfonyl chloride, the amine is diethylamine, the temperature is 0° C. to −70° C. and the hydrohalide acceptor is triethylamine.

6. The process of claim 1 wherein the halide is β-chloroethanesulfonyl chloride.

7. The process of claim 1 wherein the halide is β-bromoethanesulfonyl chloride.

8. The process of claim 1 wherein the amine is diethylamine.

9. The process of claim 1 wherein the amine is isopropylamine.

10. The process of claim 1 wherein the amine is dioctylamine.

11. The process of claim 1 wherein the amine is laurylamine.

12. The process of claim 1 wherein the amine is 2-ethylhexylamine.

13. The process of claim 1 wherein the amine is distearylamine.

14. The process of claim 1 wherein the amine is octadecylamine.

15. The process of claim 1 wherein the amine hydrohalide acceptor is a member selected from the group consisting of pyridine, 2,6-lutidine, collidine, trimethylamine, triethylamine, tripropylamine.

References Cited by the Examiner

Goldberg: J. Chem. Soc., pages 464–67 (1945).

Petrov et al.: Zhur. Obsch. Khim., vol. 29 (May 1959), pages 1494–96.

JOHN D. RANDOLPH, *Primary Examiner.*

WALTER A. MODANCE, *Examiner.*

H. I. MOATZ, *Assistant Examiner.*